United States Patent [19]

Symmank

[11] 4,000,616
[45] Jan. 4, 1977

[54] MULTI-ENGINE MULTI-PUMP HYDRAULIC SUMMATING SYSTEM

[75] Inventor: William D. Symmank, Schofield, Wis.

[73] Assignee: J. I. Case Company, Racine, Wis.

[22] Filed: Mar. 15, 1976

[21] Appl. No.: 666,897

[52] U.S. Cl. .................................. 60/420; 60/431; 60/486; 417/286

[51] Int. Cl.² ...................................... F15B 13/09

[58] Field of Search ............ 60/420, 421, 424, 428, 60/431, 486; 417/286

[56] References Cited
UNITED STATES PATENTS 3,723,026  3/1973  Soyland et al. .................... 417/286
3,910,044  10/1975  Symmank ............................ 60/420

Primary Examiner—Edgar W. Geoghegan
Attorney, Agent, or Firm—Dressler, Goldsmith, Clement, Gordon & Shore, Ltd.

[57] ABSTRACT

The novel arrangement of prime movers and associated driven pumps in cooperation with a hydraulic summating system disclosed in this application consists of a plurality of prime movers, each of which is connected to drive a group of interconnected fixed displacement pumps. Separate sets of pumps are formed with one pump of each driven group connected in parallel to supply fluid under pressure to separate systems containing various hydraulically operated functions. The summating system includes a valve arrangement whereby the total engine power generated by the prime mover of each group of pumps is available for one or all pumps in the group and thus any one or all of the hydraulically operated functions in each system has available all or a portion of the prime movers' total engine power up to the maximum available.

10 Claims, 3 Drawing Figures

MULTI-ENGINE MULTI-PUMP HYDRAULIC SUMMATING SYSTEM

BACKGROUND OF THE INVENTION

This invention relates to a hydraulic drive system capable of operating a plurality of hydraulic drive members found in heavy equipment, such as, excavators, backhoes, and the like.

There are many different types of heavy construction equipment that use hydraulic drive systems for transmitting energy to the operating parts of the machinery in question. Machines of the type under discussion include a backhoe or shovel-type excavator, which basically has six main functions and several auxiliary functions. By way of example, this application will deal with the six main hydraulically operated functions of an excavator, which includes swing, crowd, tool, hoist, and the two motors for driving the separate tracks of a track-mounted excavator. A novel hydraulic system using one prime mover to drive a plurality of pumps is disclosed in U.S. Pat. No. 3,910,044 to Symmank for this excavator example, and reference may be made thereto for a detailed description. It is to be understood that the novel arrangement of a plurality of prime movers and pumps in a hydraulic system disclosed herein can be utilized wherever it is desired to have a simple summating system to accomplish any combination of pressures and compensate instantly for the power requirements of multiple pump units driven by a plurality of prime movers.

In order to facilitate an understanding of the application of the novel hydraulic system, a brief description of the operation of an excavator is believed to be in order.

Generally speaking, the swing movement of an excavator requires the use of a positive displacement motor or hydraulic motor for rotating the upper structure of the excavator about a turntable and about a vertical axis. The crowd movement involves the use of one or more hydraulic cylinders that are interconnected between the boom and the dipper stick of the excavator for providing pivotal movement therebetween. The tool or bucket function also involves the use of a hydraulic drive cylinder for pivoting the bucket about a horizontal pivot point at the outer end of the dipper stick. The hoist involves the use of one or more hydraulic drive cylinders for lifting the hoist and dipper stick and pivoting them about a horizontal axis on the body of the excavator. As previously mentioned, a variety of other functions may also be performed by the use of hydraulics, but in this application, we will deal with the major ones referred to above.

As can be appreciated from the above, the operator has usually four, and often more, functions to control simultaneously. In conventional hydraulic systems for an excavator, in order to accomplish the constant speed or desired pressure, which may be required for each function, there have been utilized separate hydraulic pumps, each of which is operated by a common prime mover. In such an arrangement, obviously, the combined demand for all the pumps cannot exceed the available engine power and each of the individual pumps is provided with the capability of putting out the required level of energy to operate the particular function it is designed to control. With such a system, it is clear that the total available engine power can only be used when all of the pump and machine functions are being operated simultaneously.

Another arrangement which has been used is to employ a number of pumps, each of which is designed to handle a plurality of individual hydraulic functions. Such a system is economical in that it is designed to transmit a portion of the available engine power to a series of functions and respond in a completely modulating manner with respect to a power demand of any one, or combination of functions. In such a circuit, maximum utilization of the hydraulic energy supplied to said series of functions is accomplished. Specifically, power summation is obtained when varying pressures or flows are required of any function with respect to other functions. As applied to excavators, there have been used a pair of systems that are essentially two-pump, fixed-displacement, split-horsepower systems, which function to economically summate power requirements within each of the two split power units.

Other attempts at obtaining maximum utilization of a common prime mover include very expensive, highly complicated variable-displacement pumps, but these systems are subject to the aforementioned disadvantages.

In the U.S. Pat., No. 3,910,044, to Symmank, there is provided a system which in an illustrated preferred embodiment includes a plurality of fixed displacement pumps that are operated by a common prime mover. As in the previous systems, each of these pumps is set up to economically summate the power requirements of the hydraulic functions that each pump is set up to provide. However, while these systems operate in this fashion, they are further combined so that the total engine power is available to only one of the pumps or the engine power is split among the pumps according to the power demand of all of the hydraulic functions, which thus results in the total engine power being available on demand for only one or any combination of the hydraulically operated functions of the excavator. For example, if one of the systems was being used to control the hoist cylinder, tool cylinder, and one of the track motors and the "on demand" requirements of that system at a given instant required the total engine power available for both pumps and the other operations of the excavator were not demanding of any of the power available by the prime mover, then the pump controlling the hoist, tool and track would have available to it the total engine power. Similarly, if one pump was called upon, for example, to supply pressure requiring two thirds of the total engine power and the other pump one third, the novel hydraulic summating system forming the essence of the present invention would provide this mode of operation.

Thus, maximum engine power is available to all of the hydraulic functions and can be utilized at all times, even though several of the functions may not be making demands on the engine at any given time. In effect, what is happening is that available hydraulic energy is being diverted into the system where it is needed.

The use of a summating system with a plurality of pumps driven by a common prime mover provides for the total prime mover power to be available to each of the fixed volume pumps in the system while permitting the pumps to divide up the power in whichever way the demands are present. If the hydraulic systems become larger and if the excavating machines actuated by them require more power, a larger and more powerful prime mover is required. As the prime mover size increases, the initial cost and service cost increases. It is generally known that relatively small electric motors can be used as prime movers and that their cost is much less than relatively large electric motor prime movers. In fact, owing to the larger quantity of small motors produced and the economies of scale associated with such production, the cost of a number of total small motors equivalent in total power to a large motor is less than the cost of the large motor. For example, it is not uncommon today to find that the cost of two 225 hp motors is only a little more than one-half of the cost of one 450 hp motor.

From the foregoing, it is seen that it is desirable to use a number of smaller motors in place of one larger motor to furnish the increased power requirements of a larger hydraulically operated machine.

If a number of smaller prime movers are to be used in place of one large prime mover, it is additionally desirable to be able to arrange the prime movers and driven pumps in combination with a summating system so that maximum engine power of each prime mover is available to its connected pumps in the hydraulic systems while permitting the pumps to divide up the power in whichever way the demands are present.

SUMMARY OF THE INVENTION

The applicant's novel arrangement provides for the use of a plurality of prime movers, each of which is connected to a group of pumps, and incorporates all of the power demand summating features existing on current production systems. Additionally, it permits the use of several pumps operating in parallel sets to supply hydraulic loops having a plurality of hydraulic functions with the summation within summation power converting capability between each of the several loops. The system offers desirable constant speed of operation in such a way as to summate the power requirements of all functions simultaneously and to divert the available engine power of a prime mover, which is connected to a group of pumps, to any function or combination of functions as may be dictated by the work demand of these functions. Essentially, the novel arrangement provides for the total engine power of each prime mover to be available to each of its connected fixed volume pumps in separate hydraulic loops while permitting the connected pumps to divide up the power in whichever way the demands are present.

In the illustrated embodiment, there are shown two prime movers and four fixed-displacement pumps arranged in pairs, but it is to be understood that this is by way of example only.

The systems connected up to each of the pairs of pumps summate within themselves, which means that the output of the pump pairs will go to the functions that demand the hydraulic pressure desired, but the pairs of pumps associated with each hydraulic system are interconnected through a valving system, so that each pump pair can collectively divide up the power available by the prime movers between the pairs in whichever way the demands call for.

The novel valve arrangement in question includes two relief valves, which may or may not be pilot operated, depending on size and other limitations. Each of these relief valves has a valve head member subject to the pressure on the high-pressure side of one of the pump pairs and a piston area exposed to the high-pressure output from the other pump pair. The valves are spring-biased and the head and piston areas are designed so that the valves will open up to by-pass some of the fluid under pressure back to the inlet of the pumps when the pressures in the pump outlets reach the maximum allowable as determined by the connected prime mover. In the illustrated embodiment, the areas of the valve heads and pistons exposed to pump pressures are equal and thus both valves will open at the same time to bleed fluid, regardless of the pressure in each of the systems, so long as the total pressure is equal to the allowable maximum pump pressure to which the relief valves will be set.

If it is desired to have one system bleed out earlier than the other so as to maintain a minimum pressure in one of the two systems, or to maintain a fixed differential between the two systems, the valve areas and piston areas can be adjusted to accomplish this.

With this novel and efficient, but simple and inexpensive arrangement, which is accomplished by two relatively inexpensive prime movers and four relatively inexpensive fixed-volume pumps, oil will not be bled back to the inlet of the pump until the total pressure present in the system is equal to that which would bring about stalling of the prime mover. Assuming that it takes 4000 psi. before one of the prime mover stalls or trips out on overload, the valve areas and spring pressures are designed and set, so that oil will not be bled back until 4000 psi. has been reached, which 4000 psi. can be made up of 2000 psi. in one system and 2000 psi. in another, 3000 psi. in one and 1000 psi. in another, or 4000 psi. in one and zero in another, or in any other combination what will be brought about by virtue of the demands on the total system.

The following description of the drawings will point out some of the advantages and is intended to be illustrative of one of the embodiments of the invention.

DESCRIPTION OF THE PREFERRED EMBODIMENT

Figure 1:
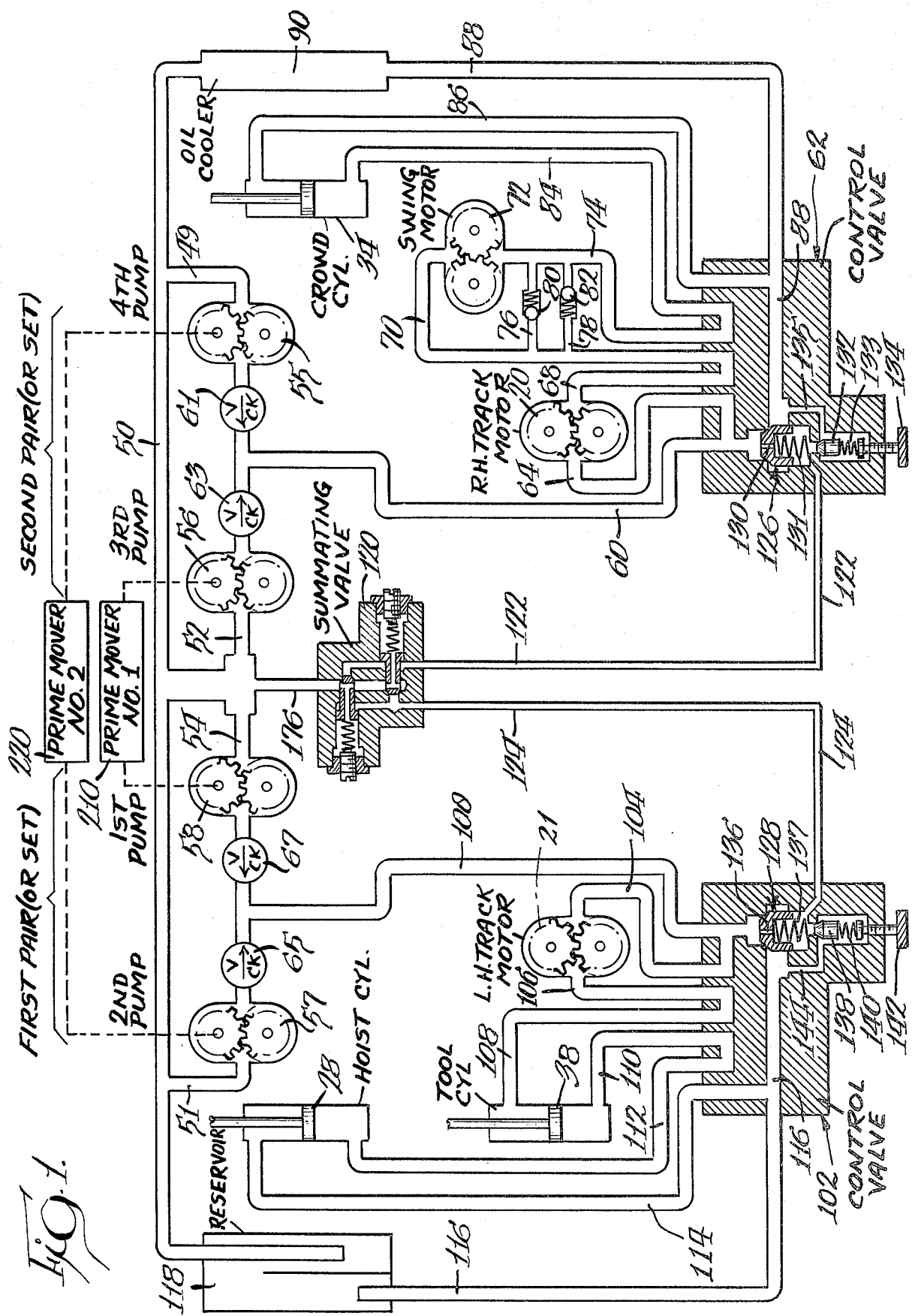
FIG. 1 is a schematic diagram of the novel arrangement of prime movers and driven pumps in the hydraulic system.

For purposes of simplicity in describing the invention, a hydraulic drive system of the type used for operating the various functions of a shovel-type excavator or backhoe will be described. It is to be understood, however, that the novel inventive hydraulic system may be used for other types of machines having a plurality of hydraulically operated functions. Essentially, the invention, as aforementioned, is a novel summating system for summating a plurality of fixed-volume pumps being operated by a plurality of prime movers in order to obtain the maximum power available for the prime movers, as called for by the demands being serviced by the hydraulic pumps.

Reference may be made to the U.S. Pat. No. 3,910,044, to Symmank for the details of construction of a shovel-type excavator to which the hydraulic system shown in FIG. 1 applies. The major hydraulic actuator components, shown in FIG. 1, will not be described as they relate to actuation of typical excavator motions.

In general, in a shovel-type excavator, there is an upper structure pivotally carried about a vertical axis on a turntable mounted above a pair of drive tracks. A hydraulic drive motor, known as, and labeled in FIG. 1 as, the swing motor 72, is operated by pressurized hydraulic fluid and is provided for pivoting or swinging the upper structure. The swing motor 72 is provided for selectively swinging the upper structure continuously in one direction or the other. This swing motor 72 is one of the basic hydraulic drive members used in the type of shovel excavator to which this hydraulic system applies.

The excavator includes a pair of drive tracks for moving the excavator over the ground. Each track is driven by hydraulically-operated positive-displacement gear motors 20, 21 driven by pressurized hydraulic fluid. Each of the hydraulic motors is independent of the other.

A main lift boom is pivotally mounted about a horizontal axis on the upper structure of the excavator. A lift or hoist cylinder 28 is pivotally connected at its cylinder end to the upper structure of the excavator and at its piston rod end to the center portion of the lift boom. The lift or hoist cylinder 28 performs the second basic function of the excavator, that is, the lifting or hoisting function.

A dipper stick is pivotally connected to the outer end of the lift boom. A hydraulic cylinder 34 is pivotally connected at its cylinder end to the upper side of the lift boom and is pivotally interconnected at its forward end to the inner end of the dipper stick. Drive cylinder 34 acts as the crowd cylinder, which pivots the dipper stick relative to the lift boom. The crowd cylinder 34 thus performs the third basic hydraulic function of the excavator.

A bucket is pivotally mounted at the outer end of the dipper stick. A tool cylinder 38 is pivotally connected at one end to the dipper stick and is interconnected to the bucket at its piston rod end. The tool cylinder 38 pivots the bucket relative to the dipper stick and performs the fourth basic function of the excavator.

For ease of operation for an operator, it is desirable that a constant speed be provided for each of the basic functions, since this provides a more desirable habit-forming method of operation. The speed is desirably substantially constant, while the power is variable.

In the excavator, a normal work cycle involves the use of the crowd cylinder 34 and the tool cylinder 38, or the use of the crowd cylinder 34 and a hoist or lift cylinder 28 for the purpose of excavating. After the load has been received in the bucket, the second part in the normal sequence of operation involves simultaneously operating the hoist cylinder 28, the crowd cylinder 34, the swing motor 72, and the tool cylinder 38 for transferring and depositing the excavated material. The third step in the sequence of operation involves the use of the swing motor 72, the crowd cylinder 34, the cylinder 38, and the hoist cylinder 28 for repositioning the bucket 36 for the next sequence of operation.

The described sequences of operation conventionally involve the use of two high-power demand functions at the same time. The functions demanding the higher power vary in demand during the work cycle and, as is obvious to one skilled in the art, during simultaneous operation of all four of the drive members, two drive members have relatively high energy requirements and two have relatively low energy requirements. With this mode of operation in mind, it is, therefore, highly advantageous to be able to operate the items requiring the high energy requirements when the energy is called for and if these drive members happen to be operated by only one of two sets of pumps, then it is very important that the total engine power of the motors be available to operate the sets of pumps supplying the system having the drive members requiring the high pressure.

As aforementioned, in prior hydraulic drive systems it was necessary to provide separate hydraulic pumps capable of responding to the maximum pressure of each of the drive members, which, needless to say, makes for a very expensive, very complicated system. Although improvement has been in that it has been known to provide a plurality of pumps, each of which handles a series of functions that are summated within its individual system, there have been no systems available using a plurality of prime movers with a set of pumps associated with each separate hydraulic loop where there was a summating of the pressure available to the individual loops, so that the total pressure output capability of the prime movers could be used by one of the sets of pumps, or each of the sets of pumps in response to demands thereon. In this way, those operations that, at any particular time, happen to demand the total pressure could be serviced.

Referring now in detail to FIG. 1, there will be explained the system schematically illustrated, which explanation will consist of describing the system as if it were a two-pair, split pump system, i.e., wherein a single pair of pumps is used to provide fluid under pressure for a plurality of functions associated with one hydraulic loop, which system will summate the requirements of the functions serviced by the pump pair in question. Thereafter, the additional mechanisms will be described wherein the two-pair pump systems are interrelated so they function as a totally summated system wherein any one or plurality of the functions being serviced by the pumps will be available to have provided to it the maximum pump pressure, or any portion thereof as required by the demands placed thereon.

The hydraulic system consists of two separately pressurized hydraulic loops or systems. Two groups of pumps, driven by two separate prime mover motors, supply fluid under pressure to the systems. Prime mover No. 1, designated as 210, drives a pair of fixed gear pumps 56 and 58. Prime mover No. 2, designated as 220, drives a pair of fixed gear pumps 55 and 57.

Referring first to the system found on the right-hand side of FIG. 1, there is shown a supply conduit 50 containing low-pressure oil which flows into conduits 49 and 52, leading to the fixed volume gear pumps 55 and 56, respectively. As aforementioned, the loop or system being supplied fluid under pressure from pump pair 55 and 56 will be first described in detail and thereafter the loop being provided by the fluid under pressure from pump pair 57 and 58 will be described. It should be noted that the pumps are drivably connected to the prime movers in a particular arrangement. Specifically, it should be noted that prime mover No. 1, designated as 210, drives a group of pumps consisting of one pump in each loop and prime mover No. 2, designated as 220, drives a group of pumps consisting of one pump in each loop. By way of example, we will assume that each prime mover has a maximum capability of providing a maximum pressure of 4000 psi. with either of its connected pumps.

Returning now again to the system on the right-hand side of FIG. 1, pump pair 55 and 56 pumps pressure fluid into a common discharge conduit 60. At the discharge of each pump 55 and 56 is a conventional one-way check valve 61 and 63, respectively. The check valves allow one of the two pumps to pressurize the system if the other pump is not functioning for any reason. Conduit 60 leads to control valve 62. The control valve 62 is a conventional valve which directs the flow of fluid leading from conduit 60 to the respective sides of the components that are to be operated, which will be described hereinafter. Briefly, the control valve directs fluid to whichever side of the track motor, swing motor, or crowd cylinder is called for by the operator, which control valve is operated by control mechanisms conventional in nature and not forming a part of the present invention.

Essentially, the control valve 62 functions to determine which way the track motor is to be driven, the excavator is to swing, and the crowd cylinder is to move. As illustrated, the control valve 62 is positioned to interconnect conduit 60 with condut 64 leading into the left-hand side of track motor 20. The outlet conduit 68 of track motor 20 interconnects with conduit 70 leading to the upper portion of swing motor 72. The outlet of swing motor 72 communicates with conduit 74 that is interconnected to conduit 84 leading into the piston end of crowd cylinder 34. Conduit 86 communicates with the rod end of crowd cylinder 84 and is interconnected to exhaust conduit 88 leading to oil cooler 90 and back to pump supply conduit 50. As illustrated, both the track motor 20 and the swing motor 72 are positive-displacement, gear-type motors. The swing motor functions to cause the upper structure of the excavator to pivot on the turntable above the tracks.

As was previously indicated, it is understood that the control valve 62 may alternate the pressure side of the swing motor and the track motor, so that the track may be driven in the opposite direction, or the upper structure swung in a different direction requiring the pressure fluid to be diverted from one of conduits 70, 74 to the other of conduits 70, 74. In describing the various hydraulic cylinders and motors used in the operation of the described system, movement of the particular drive member will be described as being in one direction only; however, it is to be understood that with all the hydraulic drive motors or hydraulic drive cylinders, the operation of the appropriate control valve could change the operation of the specific drive member in the reverse or opposite direction without departing whatsoever from the applicant's invention.

In order to provide for summation within the system being described, each of these items, including the track motor, swing motor, and crowd cylinder, are in series.

In the hydraulic system thus far described, it is important to provide cross-over relief valves 80, 82 in by-pass conduits 76, 78 interconnecting conduits 70, 74. The cross-over relief valves actually relieve pressure from whichever conduit is under high pressure to the low pressure side at a preset pressure. The importance of these cross-over valves 80, 82 will be described hereinafter in detail.

Referring now to the left-hand side of the system illustrated in FIG. 1, there is shown the pair of pumps 57 and 58, which receive fluid from conduits 51 and 54, respectively, and which pump pressurized fluid into a common discharge conduit 100. At the discharge of each pump 57 and 58 is a conventional one-way check valve 65 and 67, respectively. The check valves allow one of the two pumps to pressurize the system if the other pump is not functioning for any reason. Conduit 100 leads to control valve 102. As previously mentioned, the control valve is set to determine which conduits are interconnected, thus determining the direction of movement of the track motor 21, the tool cylinder 38, and the hoist cylinder 28, which form part of the system about to be described. The conduit 100 is shown connected to conduit 104 leading to the left-hand track motor 21. The outlet conduit 106 is shown connected to conduit 108 which leads to the rod portion of tool cylinder 38 and the piston portion of cylinder 38 is interconnected to conduit 110 which connects with conduit 112 through control valve 102. Conduit 112 is connected then to the piston end of hoist cylinder 28 and conduit 114 leads from the rod end of hoist cylinder 28 back to the control valve 102 and out to conduit 116 to reservoir 118 and thereafter to supply conduit 50.

The present invention is directed to the novel arrangement of prime movers and connected pumps in cooperation with a summating system for summating the operations of all of the pumps 55, 56, 57, and 58, but it is important to understand the operation of the individual hydraulic loops or systems operated by each of the pump pairs. Each of the individual systems supplied by the pump pairs 55/56 and 57/58 summates the functions provided with fluid under pressure thereby, and the present invention in effect permits the pressures provided by the sets of pumps to be summated for the two systems, thereby insuring that any particular function, or functions, can have available to it whatever portion of the total pressure available is required.

Returning now to a description of the summation of each of the individual systems, it is noted that when the operator desires to operate the swing motor independently of all the other hydraulic functions, the control valve 62 can be regulated to direct the full pressure to the swing motor 72. This motor is a positive-displacement, gear-type motor, but it cannot absorb the full pump volume, since the motor must accelerate from a stop position to a full swinging position. During acceleration, the pressure in the line 70 builds up rapidly, but since the motor cannot absorb the full pump volume, the cross-over relief valve 80 relieves from the high-pressure line 70 across to the exhaust line 74. (In reverse movement of the motor 72, the relief valve 82 relieves pressure from line 74 to line 70.) The hydraulic fluid, in the low-pressure line 74 in an amount equal to the pump volume, passes to the exhaust port of the control valve 62 and then to the oil cooler. It is to be kept in mind that in this description, the demand on the system is only coming from the swing motor. Thus, there would be no fluid under pressure directed to the crowd cylinder. When the swing motor 72 has obtained a speed which absorbs the full fluid displacement of the pump 56, the cross-over valve 80 closes and the full pump volume passes through the motor 72 to provide peak swing speed.

When the operator wishes to perform the crowd function independently of the other functions of the system, the pump 56 passes the pressure fluid into the control valve 62, which passes the fluid directly therethrough into communications with the crowd cylinder 34 as the piston contained within the cylinder moves the fluid in the low-pressure or exhaust side of the cylinder 34 back through conduits 86 and 88 to oil cooler 90 and supply conduit 50. When the crowd cylinder operates independently, it is capable of being powered by the full pump pressure and, depending on the demand, the prime mover will be governed accordingly.

The advantages of summating within the separate systems, such as, the system on the right of the drawings connected to the pump pair 55 and 56, are when the swing and crowd functions are operated together. Thus, when the operator desires to operate the swing and crowd to pivot the upper structure of the excavator, the pump volume from pumps 55 and 56 is first directed to the swing motor 72. However, just as when the motor 72 is operated independently, it is not possible for the motor 72 to absorb the full volume of the pump pair when starting from a stop position. Pressurized fluid which is not passed through the motor 72 and into the line 74, thus passes through the cross-over valve 80, which relieves at, for example 1200 psi., so that the pressurized fluid passes directly from the pressure line 70 to the exhaust side 74. The pressurized fluid which passes through the swing motor 72 and the exhaust fluid which passes through the cross-over valve 80 are re-united on the exhaust side of the swing motor 72. The fluid is then directed to the control valve 62, where the full pump pair volume passes upwardly through the conduit 84 and constant speed is provided for the crowd function, even though the swing speed is varied due to acceleration of the large mass which the swing motor 72 must move. The power torque provided by the swing motor 72 is limited by the cross-over valve 80 when the crowd cylnder 34 has a low-power demand. The power of the swing motor 72 is also limited by the cross-over valve 80 when there is a constantly varying or a high-power demand by the crowd cylnder 34. As seen, the swing motor exhaust pressure is used as the pressure which powers the crowd function. The power or torque output of the hydraulic swing motor 72 is proportional to the difference in the pressure between the pressure line 70 and the exhaust line 74. In an example, when a power demand by the crowd cylinder 34 is low, the pressure in the lines 74 and 84 is equal to, for example, 200 psi. This 200 psi. acts on the cross-over relief valve in such a way as to apply 200 psi. pressure to hold the valve 80 closed. Since 1200 psi. differential is required in the lines 70 and 74 to cause the pressure in the line 70 to be relieved, this means that the pressure in line 70 must be 1400 psi. before the cross-over valve 80 relieves the pressure. When the power demand of the crowd cylinder 34 increases, the pressure increases to, for example 400 psi. This means that the pressure must be 1600 psi. in the line 70 before the cross-over valve 80 relieves the pressure. In this way, the available swing power remains constant, even though the crowd function powered by the same pump pair 55 and 56 requires infinitely changing power demand.

This system provides a means of communication between the swing function and the crowd function, that is, between the swing motor 72 and the crowd cylinder 34, in such a way as to allow the available pump energy to be automatically diverted to the required demand of a particular function in direct relationship to the power demand of the second function.

From the foregoing description, it is seen that the pump pair 55 and 56 operates the swing motor 72 and the crowd cylinder 34, which functions are placed into direct and constant communication with each other, and the power demand of one has a direct relationship to the power demand of the other.

Referring now to the left-hand side of FIG. 1, it will be shown how this portion of the total system is also a fully summated system in that it will provide for operation of the tool cylinder alone, operation of the hoist cylinder alone, operation of the track motor, or simultaneous operations of one or more of these elements. Specifically, it is illustrated that, as shown on the left-hand side of FIG. 1, the track motor 21, tool cylinder 38, and hoist cylinder 28 are connected in series. The control valve 102 has been positioned to illustrate a given direction of movement of the track motor 21, downward movement of the tool cylinder 38, and upward movement of the hoist cylinder 28. As previously mentioned, the control valve can be adjusted to vary the direction of movement of each of these components, depending upon the operator's wishes.

To operate either of these functions simultaneously, or independently, one merely has to position the control valve in the requisite manner. For example, when it would be desired to operate the track motor alone, the conduit 106 would be connected up to exhaust conduit 116. Similarly, if it is desired to operate the track motor 21 and tool cylinder 38, the pressure fluid would flow through the track motor 21, conduits 106 and 108, into the tool cylinder 38, and the exhaust side of the tool cylinder would be directed to the low-pressure conduit 116. The fluid under pressure required for whichever of the functions is being operated would be provided up to the maximum available pressure within the framework of that which can be provided by the pump pair 57 and 58. It is not believed necessary to describe this system any further, since, as can be appreciated, this system will be a fully summated system in the same general manner as indicated when referring to the right-hand side of the system illustrated in FIG. 1.

As previously mentioned, the essence of the present invention is the arrangement of a plurality of prime movers connected to drive groups of pumps which are interconnected in a certain manner so as to be able to summate the power requirements of all of the functions described herein simultaneously and to divert the available engine power to any function or combination of functions as may be dictated by the work demand of those functions. Thus, if it is desired that the hoist cylinder and tool cylinder be provided with, for example, 4000 psi. pressure, the pump pair 57 and 58 would have at its disposal this pressure which exists because the available engine power of each prime mover No. 1 and No. 2 is capable of producing this much pressure. Of course, it is understood that since this is the maximum pressure that is available by the prime movers, no pressure would be available to run any of the other hydraulically operated functions of the other loop. However, if it is desired that the tool cylinder 38 and lefthand track motor 21 call for 3000 psi., then 1000 psi. would be available for the other functions, or if there was any other split, such as, 2000 psi. for the track motor 21, tool cylinder 38 and hoist cylinder 28 and 2000 psi. for the swing motor 72, track motor 20 and crowd cylinder 34, this would also be available.

The foregoing is accomplished by incorporating in the aforementioned system a summating valve 120 which is interconnected with the high-pressure line 60 leading from the common discharge of pump pair 55 and 56 by conduit 122 and with the high-pressure line 100 leading from the common discharge of pump pair 57 and 58 by conduit 124. In the embodiment illustrated, conduit 60 is connected with conduit 122 through the action of a pilot valve 126. The purpose of providing a pilot valve is so that a relatively small summating valve can be used and yet the system will have the capability of by-passing a large amount of fluid back to the inlet side of the pump in the event the maximum pressure is reached. It is sufficient to note at this time that the pilot valve 126 includes an orifice 130 interconnecting conduit 60 with conduit 122 and the pilot valve 126 is maintained closed by a spring 131. There is also provided a pilot relief valve 132 which can be adusted to open at a preset pressure to determine the maximum pressure in conduit 60. This valve can be set at whatever pressure desired and the advantage of this will be discussed hereinafter. Briefly, the setting will be determined by spring 133, which can be adjusted by knob 134. There is a similar pilot valve 128 interconnecting conduit 100 with conduit 124, and this valve also includes an orifice 136 interconnecting conduits 100 and 124 and a spring 137 which maintains the valve 128 closed to prevent the by-pass of fluid from conduit 100 to exhaust condut 116. A pilot relief valve 138 similar to pilot relief valve 132 and including spring 140 and adjusting knob 142 for setting the maximum pressure in conduit 100 is also provided. The differential areas of valves 126, 128 and the setting of springs 131, 137 determine the pressure drop across the valves 126, 128, respectively, that is required prior to opening thereof.

Figure 2:
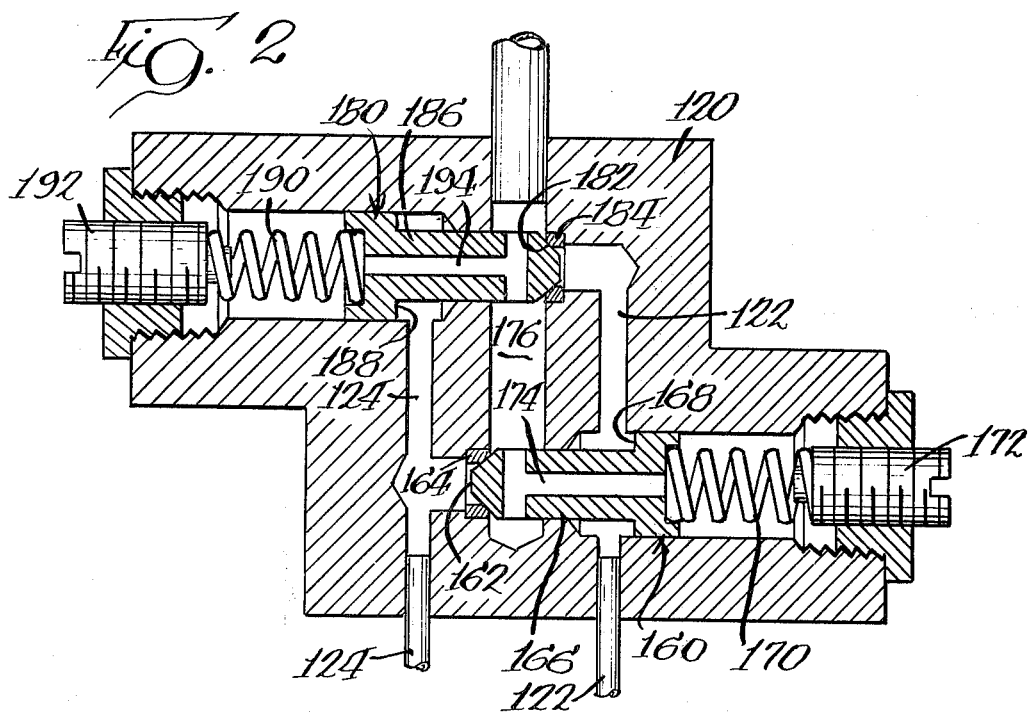
FIG. 2 is an enlarged view of the pressure relief valve.
Figure 3:
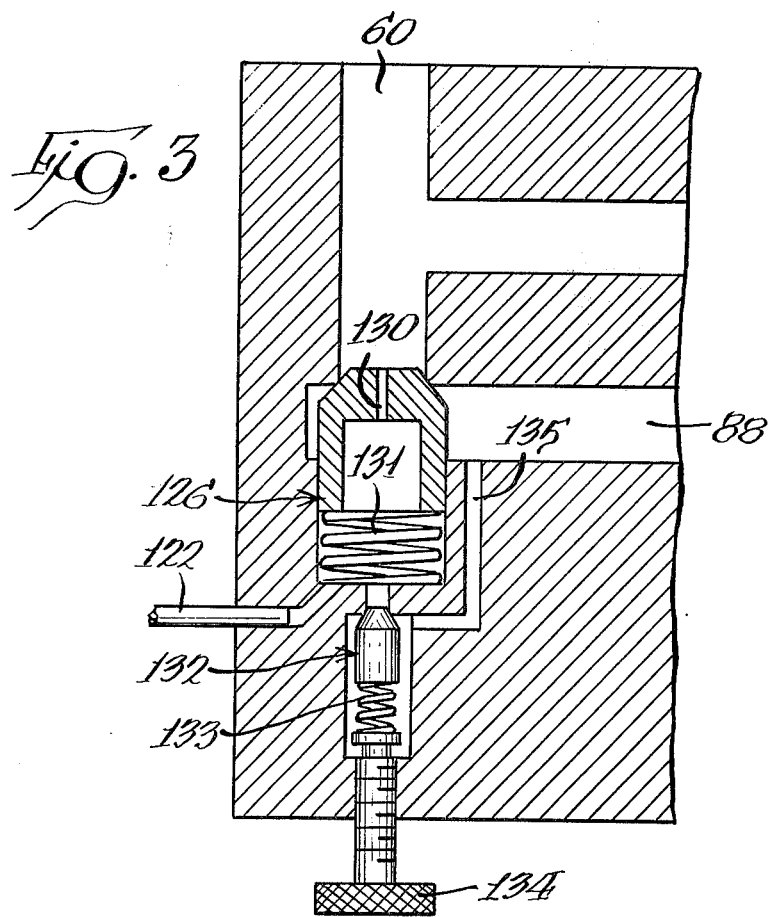
FIG. 3 is an enlarged view of a pilot valve used in the illustrated system.

The specific details of the summating valve can best be seen by referring to FIG. 2. The summating valve 20 essentially consists of two pressure relief valves 160, 180, both of which have exposed pressure actuation areas responsive to the pressure in lines 122 and 124, as will be described hereinafter.

Referring first to relief valve 160, there is illustrated a valve head portion 162 which rests on valve seat 164, blocking off the flow of fluid in the orifice between conduit 124 and low-pressure exhaust conduit 176 that leads back to the inlet of pump pairs 55/56 and 57/58. The valve stem 166, connected to the valve head 162, is provided at its upper end with an additional piston area portion 168 which is in communication with conduit 122. The valve is maintained seated on seat 164 by a spring 170, the setting of which is determined by spring adjuster 172. Valve bore 174 prevents the build-up of pressure in the chamber containing spring 170.

The valve 180, as shown, is identical to valve 160 and includes valve head 182, which seats on seat 184, blocking off the flow of fluid under pressure in the orifice between conduit 122 and exhaust conduit 176. The valve stem 186, connected to the valve head 182, has defined at its upper portion an additional piston area portion 188 against which is biased a spring 190 that maintains the valve closed against the valve seat 184. The adjustment of spring 190 is provided by spring adjuster 192. Valve bore 194 prevents build-up of pressure in the chamber containing spring 190.

It is to be noted that in the embodiment illustrated, the areas 162, 168 and 182 and 188 are equal and the spring settings 170 and 190 are equal and are adjusted so that when the total pressure in conduits 122 and 124 equals 4000 psi., the two valves will open to bleed hydraulic fluid back to the exhaust conduit 176. With the aforementioned identical settings, when pump overload occurs, both of the valves open to relieve the pressure in both systems.

Thus, since the valves 160 and 180 will not open to bleed fluid until the total pressure in the system is equal to the maximum available pressure and since the pump pairs 55/56 and 57/58 are capable of putting out anywhere from zero to the maximum available pressure, any one of the functions, or any combination of the functions can have any proportion of the available pressure in the system. For example, it can be appreciated that if the tool cylinder 38 and the left-hand track motor 21 required 3000 psi., this 3000 psi. will act through conduit 100 and orifice 136 in pilot valve 128 into conduit 124 and act on valve piston area 188 and valve head area 162. Since, for the purpose of illustration the sum of these areas is equal to 1 sq. in., there will only be a total of 3000 lbs. tending to open the valves 160 and 180, which will be insufficient (the springs 170 and 190 being set at 4000 lbs.) and, therefore, there will be no bleeding back to the low-pressure side of the pump pairs. If, at the same time, there is a demand from the righthand track motor for 1000 psi., then this 1000 psi. is available to the pump pair 55/56 and the systems which demand the total of 4000 psi. will be operative. It is to be noted that the pumps are governed and operate in accordance with the demand requirements placed on them by the hydraulic functions to be operated thereby.

In the event the demand of the totally summated system exceeds 4000 psi., both halves of the system will by-pass fluid under pressure back to the inlet of the pumps until the pressure is returned to the total available, which, as previously mentioned in the example illustrated, is 4000 psi. For example, if the demands of each pump pair are 2000 psi., both relief valves 160, 180 will open. If the demand of one pump pair is reduced to 1900psi., then the allowable demand for the second pump pair will be increased by the same amount to 2100 psi. This would continue until one pump pair would have a maximum allowable of 4000 psi. As the workload demand on the lower pressure side begins to increase, the available pressure on the higher of the two will be decreased. The by-pass of high-pressure fluid to exhaust is accomplished by opening one or both of the pilot valves 126, 128 due to the drop in pressure in one or both of the chambers containing springs 131, 137. The unbalanced pressure resulting from the opening of the relief valves 160 and/or 180 will result in valves 126 and/or 128 opening to by-pass fluid to exhaust conduits 88 and/or 116.

If it is desired to insure that each will have its own independent priority and thus when the pressure reaches the maximum limit, only the higher working pressure of the two summating valves will open to limit the available workload, then the piston areas 168, 188 will be slightly less than the valve head areas 162, 182, respectively. For example, if the retaining springs 170 and 190 are adjusted to a 4000 lb. resistance and areas 162 and 182 are arranged to have 1 sq. in. of exposed surface and areas 168 and 188 had a 0.99 sq. in. of exposed surface, then areas 162 plus 168 would have 1.99 sq. in. of exposed area and 182 plus 188 would have 1.99 sq. in., respectively. If the working pressure at area 162 would be 4000 psi. and 0 psi. at 168, the spring 170 would compress and limit the working pressure of pump pair 57/58 4000 to psi. At the same time, the 4000 psi. of pump pair 57/58 would be subjected to the 0.99 sq. in. of area 188, which would result in a load of 3990 lbs. on the spring 190, which is present at 4000 lbs. The retaining force being higher than the load would insure that the valve 180 would remain in the closed position, thereby giving priority to the lower operating pressure of either pumping unit. As the demand of the lower working pressure would increase, the allowable pressure of the higher demand would decrease until both demands would become equal, at which time both relief valves would open. The combined areas of each poppet being 1.99 sq. in. which is retained by the 4000 lb. spring force would result in a pressure limit of 2010 psi.

It is to be noted that while in the embodiment illustrated in the summating valve 120 is designed so that both valves 160, 180 open at the same time, the invention is obviously not limited to this arrangement. For example, if it is desired to insure that a certain minimum pressure is maintained in, for example, conduit 124, so that the pressure in hoist cylinder 28 cannot go below a certain level, the designs of the valves 160, 180 will be adjusted and springs set accordingly to insure that the valve 160 controlling the flow between conduit 124 and exhaust conduit 176 will not open unless the pressure in conduit 124 exceeds that pressure required to maintain the hoist cylinder in the desired position.

Another way to accomplish predetermined priorities is to vary the setting of the pilot valve relief valves 132, 138. For example, by setting the pilot relief valve 138 to open at 3000 psi., it is assured that the system fed by pump pair 55/56 will always have available to it a minimum of 1000 psi. (assuming a total maximum of 4000 psi.). If, however, the work load requirement fed by pump pair 55/56 increases to 1200 psi., then the available 3000 psi. for the system fed by pump pair 57/58 would be reduced to 2800 psi. This could continue until a balance pressure requirement was reached at 2000 psi. availability for both pump pairs simultaneously.

It can be appreciated by one skilled in the art that the springs, piston, valve head areas, and pilot relief valves can be adjusted to provide for a variety of operating conditions.

METHOD OF OPERATION

In order to facilitate an understanding of the system disclosed in FIG. 1, the following method of operation is set forth.

Assuming that the maximum output of the pumps 55, 56, 57, and 58 is equal to a total 4000 psi. when driven by the two prime movers, the hydraulically operated components can be adjusted to use whatever portion of this pressure is available. If, for example, the track motor 20, swing motor 72, and crowd cylinder 74 require a 2000 psi., the right-hand pump pair 55/56 will be governed to provide this pressure. Similarly, if the left-hand track motor 21, tool cylinder 38, and hoist cylinder 28 require 2000 psi., the pump pair 57/58 will be governed to supply it, since the prime movers are each capable of supplying enough power to produce 4000 psi. with either of their connected pumps.

The relief valves 160 and 180 will remain closed, since they are set to open when the total pressure to which they are exposed exceeds 4000 psi.

By way of an example, if (1) the fixed displacement pumps are of equal capacity, (2) the available power from each of the prime movers could simultaneously drive their connected groups of two pumps of known volume at a total pressure of 2000 psi., and (3) the left-hand track drive motor 21 has a demand of pump pair 57/58 for only 1000 psi., then the pressure limiting summation valve 120 would instantly re-adjust to an available total work load of 3000 psi. for each pump of pair 55/56. This available pressure could be used for any combination of demands resulting from the work load of the right-hand track drive motor 20, the swing motor 72, or the crowd cylinder 34, and all functions would retain a constant speed, with the exception of the swing drive motor that could be accelerating or decelerating, but retaining its predetermined constant torque.

A still further example is a situation in which, for the purposes of illustration, the two prime movers would each have a maximum power capability of 4000 psi. total and the work load of both track drive systems each requires an equal pressure of 2000 psi. If either track drive requires a lesser pressure, the reduction of its requirement is instantly added to the availability of the opposite drive by increasing the pressure relief allowed for the higher load requirement. This system is particularly important in a power turn, where one track drive is locked, requiring no work load, and the demand of the opposite track demands full power from the prime mover. In this case, the summating pressure unit would increase the allowable pressure for the heavily loaded track drive from 2000 psi. to 4000 psi., thereby giving full torque proportioning characteristics of each track drive with respect to the other.

It can be readily appreciated from the above that any combination is available in a system where the system permits total summating of all the units utilizing output pressure from fixed displacement pumps. As previously mentioned, where the summator consists of two relief valves that are identical when the "pressure demands" exceed the total consisting of, for example, 4000 psi., the relief valves 160, 180 will open to by-pass fluid under pressure to the reservoir. In this case, the opening of the valves will reduce the pressures in the spring chambers of the pilot valves 126, 128, resulting in the pilot valves opening and by-passing large quantities of fluid under pressure back to the inlet of the pumps. However, as previously mentioned, the relief valves 160, 180 can be made slightly different with one valve having a priority over the other, whereby only one of the valves will open to bleed excess pressure.

Also within the scope of this invention is a system employing a number of separately pressurized hydraulic loops or systems in excess of two, in which case the valves forming part of the summating valve system will increase by a like amount. In such a situation each separate system could have a set of a plurality of pumps supplying the fluid pressure wherein one or more pumps from each system are connected to be driven in a group by a prime mover and wherein each prime mover thus drives at least one pump in each set. The summating valves would be designed to have a plurality of areas exposed to fluid pressure from the outlet of each of said sets of pumps and will operate in a manner similar to that herein described. Also, the valves can, of course, be designed to maintain a minimum of pressure in one system, or the other, which was discussed earlier in the specification. Furthermore, while the system illustrated in the drawings includes two pump pairs 55/56 and 57/58 having a maximum output pressure equal to the maximum available from their connected prime movers, this need not be the case. For example, one of the pumps could be much smaller than the others, which would, of course, limit its output, but as long as at least one of the pumps of each driven group is capable of utilizing the maximum power output from the prime mover to provide a maximum output pressure, such a system would encompass the present invention.

It is, of course, intended to cover by the appended claims all such modifications as fall within the terms thereof.

What is claimed is:

1. A plurality of prime movers each of which is connected to a group of interconnected fixed displacement pumps to drive same in cooperation with a summating system for controlling the fluid under pressure in a plurality of hydraulic systems, each of said hydraulic systems being supplied by a set of pumps connected in parallel, each set comprising at least one pump of each said driven group, and including a relief valve for each of said set of pumps, which valves are responsible to the fluid under pressure emanating from all of said sets of pumps, said valves controlling the flow of fluid between the outlet and inlet of said sets of pumps to relieve the pressure in the systems when the summated outlet pressures of said sets of pumps exceed the maximum allowable pressure.

2. A plurality of prime movers each of which is connected to a group of interconnected fixed displacement pumps to drive same in cooperation with a summating system for providing the requisite pressurized fluid for one or more hydraulically operated functions, said pressure being supplied by a set of said pumps connected in parallel, each said set comprising at least one pump of each said driven group so that each of said prime movers drives at least one pump of each set for providing fluid under pressure in separately pressurized hydraulic systems to operate a plurality of functions associated with each set, at least one of said pumps of each set being capable of utilizing the total output of its connected prime mover, and including relief valve means responsive to the sum of the pressures of the systems supplied by all of said sets of pumps, whereby one of said pumps of each set can utilize the total output of its connected prime mover or any portion thereof as determined by the demands of the hydraulically operated functions supplied thereby, said relief valve means functioning to relieve the pressure in said systems when the sum of the pressures in the systems exceeds the maximum allowable pressure.

3. A plurality of prime movers each of which is connected to a group of interconnected fixed displacement pumps to drive same in cooperation with a summating system for providing the requisite pressurized fluid for one or more hydraulically operated functions, said pressure being supplied by a set of said pumps connected in parallel, each said set comprising at least one pump of each said driven groups so that each of said prime movers drives at least one pump of each set for providing flud under pressure in separately pressurized hydraulic systems to operate a plurality of functions associated with each set, at least one of said pumps of each set being capable of utilizing the total output of its connected prime mover, and including relief valve means responsive to the sum of the pressures in the systems supplied by all of said sets of pumps, whereby one of said pumps of each set can utilize the total output of its connected prime mover or any portion thereof as determined by the demands of the hydraulically operated functions supplied thereby, said relief valve means including a relief valve for each of said sets of pumps and defining areas responsive to the fluid under pressure emanating from all of said sets of pumps and functioning to relieve the pressure in one or more of said systems when the sum of the pressures in the system exceeds the maximum allowable pressure.

4. An arrangement as set forth in claim 3 in which each valve is a spring-biased relief valve in which the setting thereof equals the maximum allowable force permitted to act on the valve which is equal to the exposed pressure actuation area of the valve multiplied by the pressures existing in the system supplied by said pump sets.

5. An arrangement as set forth in claim 4 in which there are provided a plurality of relief valves, each of said relief valves associated with said separately pressurized hydraulic systems, each of said relief valves having an orifice that is opened or closed by a valve head connected to additional piston areas, said valve head portion being exposed to the pressure in the common discharge conduit of said set of pumps supplying fluid under pressure to the said system associated with said relief valve and each of said additional piston areas being separately connected and exposed to the pressure in the common discharge conduit of the sets of pumps supplying pressure to the remaining systems.

6. A plurality of prime movers each of which is connected to a plurality of interconnected fixed displacement pumps to drive same in cooperation with a summating system for insuring that the various demands of hydraulically operated functions receive the required pressurized fluid to accomplish their intended functions on demand, including first and second prime movers; first and second pairs of fixed displacement pumps having a common suction, said first pair of pumps comprising a first pump and a second pump, said second pair of pumps comprising a third pump and a fourth pump, said first and second pumps being connected in parallel with a common discharge conduit to a separate first hydraulic loop to provide fluid under pressure to a plurality of hydraulically operated functions, said third and fourth pumps being connected in parallel with a common discharge conduit to a separate second hydraulic loop to provide fluid under pressure to a plurality of hydraulically operated functions, said first and said third pumps being driven by said first prime mover, and said second and said fourth pumps being driven by said second prime mover; a pressure relief valve means responsive to the fliud under pressure in said common discharge conduit of each said pair of pumps, each of said relief valve means including spring-biased valves controlling the flow of fluid under pressure between said common discharge conduit of each of said pump pairs and said suction common to both pump pairs, each of said valves having an orifice that is opened and closed by a valve head connected top an additional piston area, said valve head being exposed to the pressure in said common discharge conduit of one of said pump pairs and said additional piston area being exposed to the pressure in said common discharge conduit of the other of said pump pairs, whereby when the total force exerted on each of said valves exceeds the presetting thereof at least one of the valves will open to return the sum of the pressures in said discharge conduits to the total maximum allowable pressure as predetermined by the capability of said prime movers.

7. An arrangement as set forth in claim 6 wherein said valve head portion controls the flow from the high-pressure common discharge conduit of one of said pump pairs.

8. An arrangement as set forth in claim 6 in which one of said pump pairs is positioned to regulate the flow of hydraulic fluid under pressure in a loop controlling a first track motor, swing motor, and crowd cylinder of a hydraulically operated excavator and the other of said pump pairs controls the fluid under pressure in a loop which controls a second track motor, hoist cylinder, and tool cylinder.

9. An arrangement as set forth in claim 8 in which the first track motor, swing motor, and crowd cylinder functions are serially disposed and the second track motor, hoist, and tool cylinder are also located in series.

10. An arrangement as set forth in claim 6 including pilot means for controlling the flow between the high-pressure common discharge conduit of each of said pump pairs and one of said relief valves, whereby small relief valves can be utilized while insuring that there can be a rapid by-pass of fluid under pressure from said high-pressure common discharge conduits in the event the maximum allowable pressure in the hydraulic loop exceeds that which has been determined by the setting of said relief valves.

* * * * *